US007754315B2

(12) United States Patent
Nair et al.

(10) Patent No.: US 7,754,315 B2
(45) Date of Patent: Jul. 13, 2010

(54) MARKING ENHANCEMENT LAYER FOR TONER RECEIVER ELEMENT

(75) Inventors: Mridula Nair, Penfield, NY (US); Tamara K. Jones, Rochester, NY (US); Daniel M. Leusch, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 11/000,259

(22) Filed: Nov. 30, 2004

(65) Prior Publication Data

US 2006/0115631 A1 Jun. 1, 2006

(51) Int. Cl.
*B32B 5/16* (2006.01)

(52) U.S. Cl. .................... 428/206; 428/195.1; 428/213; 428/216; 428/219; 428/220; 428/325; 428/331; 428/336; 428/341; 428/423.1; 428/480; 428/500; 428/688; 430/124.1; 430/125.3

(58) Field of Classification Search ............. 428/195.1, 428/206, 213, 216, 219, 220, 325, 331, 336, 428/341, 423.1, 480, 500, 688; 427/121; 430/124, 126, 124.1, 125.3
See application file for complete search history.

(56) References Cited

U.S. PATENT DOCUMENTS

| | | | | |
|---|---|---|---|---|
| 2,322,037 | A * | 6/1943 | Lindquist | 430/539 |
| 3,353,958 | A * | 11/1967 | Moede | 430/535 |
| 3,370,951 | A * | 2/1968 | Hasenauer et al. | 430/535 |
| 3,411,907 | A * | 11/1968 | Whitmore et al. | 430/564 |
| 3,754,924 | A * | 8/1973 | De Geest et al. | 430/635 |
| 4,968,578 | A | 11/1990 | Light et al. | |
| 5,658,677 | A | 8/1997 | Ebisch et al. | |
| 5,846,637 | A | 12/1998 | Malhotra et al. | |
| 6,268,101 | B1 * | 7/2001 | Yacobucci et al. | 430/124 |
| 6,855,397 | B1 * | 2/2005 | Tateishi et al. | 428/195.1 |
| 2002/0003176 | A1 | 1/2002 | Muller-Girard, Jr. et al. | |
| 2003/0082354 | A1 | 5/2003 | Nakamura et al. | |
| 2003/0175484 | A1 | 9/2003 | Shirokura et al. | |
| 2003/0224192 | A1 * | 12/2003 | Tani et al. | 428/485 |
| 2003/0235683 | A1 | 12/2003 | Tamagawa et al. | |
| 2004/0013964 | A1 | 1/2004 | Ogata et al. | |
| 2004/0058176 | A1 | 3/2004 | Nakamura et al. | |
| 2004/0248028 | A1 * | 12/2004 | Tamagawa et al. | 430/124 |
| 2005/0020448 | A1 * | 1/2005 | Tamagawa et al. | 503/227 |

FOREIGN PATENT DOCUMENTS

| | | |
|---|---|---|
| EP | 1 336 901 | 8/2003 |
| WO | WO 01/22172 | 3/2001 |

OTHER PUBLICATIONS

U.S. Appl. No. 10/999,254, filed Nov. 30, 2004, Dontula et al.
U.S. Appl. No. 10/999,408, filed Nov. 30, 2004, Nair et al.
U.S. Appl. No. 10/999,411, filed Nov. 30, 2004, Nair et al.
U.S. Appl. No. 11/000,124, filed Nov. 30, 2004, Dontula et al.
U.S. Appl. No. 11/000,126, filed Nov. 30, 2004, Zaretsky et al.
U.S. Appl. No. 11/000,299, filed Nov. 30, 2004, Jones et al.

* cited by examiner

*Primary Examiner*—Betelhem Shewareged
(74) *Attorney, Agent, or Firm*—Paul A. Leipold; Carl F. Ruoff; Andrew J. Anderson

(57) ABSTRACT

The invention relates to a toner receiver element comprising a marking enhancement layer comprising inorganic particles and a polymer film-forming binder.

25 Claims, No Drawings

MARKING ENHANCEMENT LAYER FOR TONER RECEIVER ELEMENT

FIELD OF THE INVENTION

The invention relates to paper for electrophotographic printing. In a preferred form it relates to an imaging element comprising a toner receiver layer that provides photographic quality print using electrophotography and is fuser-oil absorbent, glossable, writable and fingerprint resistant.

BACKGROUND OF THE INVENTION

The production of near photographic quality images using electrophotographic imaging technology is highly desirable. It is even more desirable to produce such images on substrates that render the print with the look and feel of a typical photographic print produced with silver halide imaging technology, such as the degree and uniformity of glossiness, stiffness and opacity, and high resolution and sharpness with corresponding low grain appearance. The advantages to producing photographic quality images on such substrates using digital electrophotography include improved environmental friendliness, ease of use, and versatility for customizing images, such as when text and images are combined. Particularly desirable are glossy prints that can be marked with pen and/or pencil, a feature that is not available with glossy prints in general especially not with silver halide prints or with prints that are coated withy a UV cured coating or laminated for gloss.

U.S. Patent Application 2002/0037176 A1 discloses a receiver sheet provided with a special coating on the backside to enable writablilty but no mention is made of the ability to write on the backside after printing and glossing on that side. Similarly U.S. Pat. No. 5,658,677 discloses a one-sided image carrier where the backside is coated with silica rich coatings to impart writability. These constructions, while very useful, do not lend themselves to the manufacture of two-sided writable sheets where both sides can be imaged and where both sides can be selectively glossed and no mention is made of the ability to mark the sheet after imaging and glossing.

U.S. Pat. No. 5,846,637 describes a coated xerographic photographic paper comprised of (1) a cellulosic substrate; (2) a first antistatic coating layer in contact with one surface of the substrate; (3) a second toner receiver coating on the top of the antistatic layer, and comprised of a mixture of a binder polymer, a toner spreading agent, a lightfastness inducing agent, a biocide, and a filler; and (4) a third traction controlling coating in contact with the back side of the substrate comprised of a mixture of a polymer with a glass transition temperature of from between about −50° C. to about 50° C., an antistatic agent, a lightfastness agent, a biocide and a pigment. This paper provides for the third layer on the backside of the substrate to receive toner, but this is not sufficient for ensuring high image quality should the image be created on this third layer instead of the second layer on the other surface of the substrate.

European Patent Application 1,336,901 A1 describes an electrophotographic image receiving sheet with a toner image receiving layer containing a releasing agent and formed on a support sheet for use in a fixing belt type electrophotography. The support used in the examples had a paper base with polyethylene layers on either side, where the image side is glossy and the backside has a matte finish. No provision is made for receiving the toner image on the backside.

US Patent Application 2003/0082354 A1 discloses an image receiving sheet for electrophotography comprising a base paper and a toner image receiving layer comprising a thermoplastic resin and less than 40 percent by mass based on the thermoplastic resin, of a reinforcing filler pigment. The thermoplastic layer is infiltrated to a depth of 1 to 50 percent of the thickness of the base paper. It is desirable that the toner image receiving layer is substantially free of any pigment or filler in order to prevent blister formation and roughening of the toner image.

US Patent Application 2003/0235683 A1 discloses an electrophotographic image receiving sheet comprising a support and a toner image receiving layer containing a thermoplastic resin and a pigment disposed on the surface of the support wherein the surface of the support has a glossiness of 25 percent or more at 75° and a pigment content less than 40 percent by mass based on the mass of the thermoplastic resin. In this case also it is desirable that the toner image receiving layer be substantially free of any pigment or filler in order to prevent blister formation.

Toner particle size also plays a key role in determining image quality in electrophotography, smaller particles generally yielding better image quality. However, as the particles get smaller, the physics of the forces holding the particles to the photoconductor changes drastically, needing new methods to effectively transfer them from the photoconductor to the receiver. Photographic quality prints can be produced with this process if very small toner particles are used. The drawback with small particles is the difficulty in transferring them onto plain paper. One solution to this problem is explained in U.S. Pat. No. 4,968,578, where the surface of the receiver sheets are coated with a thermoplastic layer.

PROBLEM TO BE SOLVED BY THE INVENTION

There exists a need for improved paper for electrophotographic printing that can provide high gloss, where differential gloss, image relief, and residual surface fuser-oil are minimized. Further it is desirable that such prints be writable after imaging and glossing and exhibit fingerprint and spill resistance.

SUMMARY OF THE INVENTION

It is an object of the invention to provide a paper for electrophotographic printing that produces near photoquality prints.

It is another object to provide electrophotographic prints that are glossable with no additional overcoat.

It is another object to provide photo quality electrophotographic prints that enable pen and pencil writability even after glossing.

It is another object to provide electrophotographic glossy prints that show minimum differential gloss and do not show fuser-oil on the surface.

These and other objects of the invention are accomplished by providing a toner receiver element comprising a marking enhancement layer comprising inorganic particles and a polymer binder.

ADVANTAGEOUS EFFECT OF THE INVENTION

The invention has numerous advantages. The invention provides a paper for electrophotographic printing that can provide near photo quality high gloss prints, where differential gloss, image relief, and residual surface fuser-oil are minimized and exhibits writability on the media after imaging and glossing, and further exhibits resistance to water compared to commercially available clay coated papers and still further exhibits resistance to thermal blocking. The paper also provides an excellent degree of whiteness. These and other advantages will be apparent from the detailed description below.

DETAILED DESCRIPTION OF THE INVENTION

The toner receiver element of this invention comprises a marking enhancement layer comprising inorganic particles and a polymer binder. It further comprises in order a support, at least one polyolefin resin coating, and at least one toner receiver layer, coated on both sides of the resin coated support wherein said toner receiver layer comprises a fuser-oil sorbent additive and a thermoplastic polymer and said additive is present in an amount of greater than 10% by weight of said layer and coated over the thermoplastic layer is the marking enhancement layer comprising inorganic particles in a polymer film forming binder.

The term "support" as used herein refers to a base or a substrate material that is the primary part of an imaging element such as paper, polyester, vinyl, synthetic paper, fabric, or other suitable material for the viewing of images. The support for use in the present invention may be any support typically used in imaging applications. Typical supports may be fabrics, paper, and polymer sheets. The support may either be transparent or opaque, reflective or non-reflective. The term as used herein, "transparent" means the ability to pass radiation without significant deviation or absorption. Opaque supports include plain paper, coated paper, synthetic paper, low density foam core based support and low density foam core based paper. The support can also consist of microporous materials such as polyethylene polymer-containing material sold by PPG Industries, Inc., Pittsburgh, Pennsylvania under the trade name of Teslin®, Tyvek® synthetic paper (DuPont Corp.), impregnated paper such as Duraform®, and OPPalyte® films (Mobil Chemical Co.) and other composite films listed in U.S. Pat. No. 5,244,861. Transparent supports include glass, cellulose derivatives, such as a cellulose ester, cellulose triacetate, cellulose diacetate, cellulose acetate propionate, cellulose acetate butyrate, polyesters, such as poly (ethylene terephthalate), poly(ethylene naphthalate), poly-1, 4-cyclohexanedimethylene terephthalate, poly(butylene terephthalate), and copolymers thereof, polyimides, polyamides, polycarbonates, polystyrene, polyolefins, such as polyethylene or polypropylene, polysulfones, polyacrylates, polyether imides, and mixtures thereof. The papers listed above include a broad range of papers, from high end papers, such as photographic paper to low end papers, such as newsprint. The support used in the invention may have a thickness of from about 50 to about 500 μm, preferably from about 75 to 300 μm.

The imaging supports of the invention can comprise any number of auxiliary layers, for example, functional layers. Such auxiliary layers may include tie layers or adhesion promoting layers, conveyance layers, barrier layers, splice providing layers, UV absorption layers, and waterproofing layers.

The polyolefin resin, preferably coated on the paper support, can be any suitable melt extrusion coatable polyolefin material known in the art. Suitable polymers for the polyolefin resin coating include polyethylene, polypropylene, polymethylpentene, polystyrene, polybutylene, and mixtures thereof. Polyolefin copolymers, including copolymers of polyethylene, polypropylene and polyolefins derived from hexene, butene, and octene are also useful. The polyolefin may also be copolymerized with one or more copolymers including polyesters, such as polyethylene terephthalate, polysulfones, polyurethanes, polyvinyls, polycarbonates, cellulose esters, such as cellulose acetate and cellulose propionate, and polyacrylates. Specific examples of copolymerizable monomers include vinyl stearate, vinyl acetate, acrylic acid, methyl acrylate, ethyl acrylate, acrylamide, methacrylic acid, methyl methacrylate, ethyl methacrylate, methacrylamide, butadiene, isoprene, and vinyl chloride.

Polyethylene is preferred for coated paper supports, as it is low in cost and has desirable coating properties. Preferred polyolefins are film forming and adhesive to paper. Usable polyethylenes may include high density polyethylene, low density polyethylene, linear low density polyethylene, and polyethylene blends. Polyethylene having a density in the range of from 0.910 $g/cm^3$ to 0.980 $g/cm^3$ is particularly preferred. The polyolefin resin, such as polypropylene, may also be laminated to one or both sides of the paper support and optionally biaxially oriented.

It is desirable to incorporate white pigments in the polyolefin resin layer of the support to give the required optical properties for the support. Any suitable white pigment may be incorporated in the polyolefin resin layers, such as, for example, zinc oxide, zinc sulfide, zirconium dioxide, white lead, lead sulfate, lead chloride, lead aluminate, lead phthalate, antimony trioxide, white bismuth, tin oxide, white manganese, white tungsten, and combinations thereof. The preferred pigment is titanium dioxide ($TiO_2$)because of its high refractive index, which gives excellent optical properties at a reasonable cost. The pigment is used in any form that is conveniently dispersed within the polyolefin. The preferred pigment is anatase titanium dioxide. The most preferred pigment is rutile titanium dioxide because it has the highest refractive index at the lowest cost. The average pigment diameter of the rutile $TiO_2$ is most preferably in the range of 0.1 to 0.26 μm. The pigments that are greater than 0.26 μm are too yellow for an imaging element application and the pigments that are less than 0.1 μm are not sufficiently opaque when dispersed in polymers. Preferably, the white pigment should be employed in the range of from about 10 to about 50 percent by weight, based on the total weight of the polyolefin coating. Below 10 percent $TiO_2$, the imaging system will not be sufficiently opaque and will have inferior optical properties. Above 50 percent $TiO_2$, the polymer blend is not manufacturable.

The surface of the $TiO_2$ can be treated with inorganic compounds such as aluminum hydroxide, alumina with a fluoride compound or fluoride ions, silica with a fluoride compound or fluoride ion, silicon hydroxide, silicon dioxide, boron oxide, boria-modified silica (as described in U.S. Pat. No. 4,781, 761), phosphates, zinc oxide or, $ZrO_2$ and with organic treatments such as polyhydric alcohol, polyhydric amine, metal soap, alkyl titanate, polysiloxanes, or silanes. The organic and inorganic $TiO_2$ treatments can be used alone or in any combination. The amount of the surface treating agents is preferably in the range of 0.2 to 2.0% for the inorganic treatment and 0.1 to 1% for the organic treatment, relative to the weight of the titanium dioxide. At these levels of treatment, the $TiO_2$ disperses well in the polymer and does not interfere with the manufacture of the imaging support.

The polyolefin resins and $TiO_2$ and optional other additives may be mixed with each other in the presence of a dispersing agent. Examples of dispersing agents are metal salts of higher fatty acids such as sodium palmitate, sodium stearate, calcium palmitate, sodium laurate, calcium stearate, aluminum stearate, magnesium stearate, zirconium octylate, or zinc stearate higher fatty acids, higher fatty amide, and higher fatty acids. The preferred dispersing agent is sodium stearate and the most preferred dispersing agent is zinc stearate. Both of these dispersing agents give superior whiteness to the resin coated layer.

In addition, it may be necessary to use various additives such as colorants, brightening agents, antistatic agents, plasticizers, antioxidants, slip agents, or lubricants, and light stabilizers in the resin coated supports as well as biocides in the paper elements. These additives are added to improve, among other things, the dispersibility of fillers and/or colorants, as well as the thermal and color stability during processing and the manufacturability and the longevity of the finished article. For example, the polyolefin coating may contain antioxidants such as 4,4'-butylidene-bis(6-tert-butyl-meta-cresol), di-lauryl-3,3'-thiopropionate, N-butylated-p-aminophenol, 2,6-di-tert-butyl-p-cresol, 2,2-di-tert-butyl-4-methyl-phenol, N,N-disalicylidene-1,2-diaminopropane, tetra(2,4-tert-butylphenyl)-4,4'-diphenyl diphosphonite, octadecyl 3-(3',5'-di-tert-butyl-4'-hydroxyphenyl propionate), combinations of the above, and the like; heat stabilizers, such as higher aliphatic acid metal salts such as magnesium stearate, calcium stearate, zinc stearate, aluminum stearate, calcium palmitate, zirconium octylate, sodium laurate, and salts of benzoic acid such as sodium benzoate, calcium benzoate, magnesium benzoate and zinc benzoate; light stabilizers such as hindered amine light stabilizers (HALS), of which a preferred example is poly {[6-[(1,1,3,3-tetramethylbutylamino}-1,3,5-triazine-4-piperidinyl)-imino]-1,6-hexanediyl[{2,2,6,6-tetramethyl-4-piperdinyl)imino]}(Chimassorb 944 LD/FL).

The polyolefin resin coating on the support can include multilayer polyolefin structures, such as those achieved by multiple coatings, either sequential or via coextrusion. To minimize the number of resins required, a structure consisting of 1 to 3 layers on each side is preferred. In one embodiment of the present invention, at least one or all the layers can further comprise polypropylene. In a 3-layer structure, two of the three layers on each side may have substantially similar composition, preferably the two outer flange layers. The ratio of thickness of the center or bottom layer to an outer flange layer is in the range of 1 to 8 with 5 to 7 being most preferable. The polyolefin resin of the flange layers may contain, optionally, pigments and other addenda.

The coating of the paper base material with the polyolefin resin to form the support preferably is by extrusion from a hot melt as is known in the art. The polyolefin resin coating of the invention may be practiced within a wide range of extrusion temperatures, for example, from 150° C. to 350° C., and speeds, for example, from 60 m/min. to 460 m/min., depending on the particular intended application of the support. For many applications, preferred extrusion temperatures are from 300° C. to 330° C.

The extruded film is cast and quenched in a nip formed between a pressure roll and a chill roll. The process conditions are well known in the art and are such as to avoid air entrainment between the resin and the paper base. The surface of chill roll may be polished or matte or any other texture depending on the surface desired on the finished polyolefin coating.

The electrographic and electrophotographic processes and their individual steps have been well described in detail in many books and publications. The processes incorporate the basic steps of creating an electrostatic image, including charging and exposing a photoconductor, developing that image with charged, colored particles (toner), optionally transferring the resulting developed image to a secondary intermediate substrate, such as a cylinder with a rubber-like soft-elastic surface or a rubber blanket, and then transferring onto a final substrate or receiver and fixing or fusing the image onto the receiver. In terms of environmental stability and extending image quality, the intermediate transfer method is more desirable. The final toner receiver element of the invention has a toner receiver layer designed to receive the toner particles.

It is known to fix the toner pattern to the toner receiver layer, the toner on the receiving sheet is subjected to heat and pressure, for example, by passing the sheet through the nip of fusing rolls. Both the toner polymer and the thermoplastic polymer of the toner receiver layer are softened or fused sufficiently to adhere together under the pressure of the fusing rolls. When both the toner receiver layer and the toner soften and fuse, the toner can be at least partially embedded in the thermoplastic toner receiver layer. For self-fixing toners, residual liquid is removed from the paper by air-drying or heating. Upon evaporation of the solvent these toners form a film bonded to the paper. For heat-fusible toners, thermoplastic polymers are used as part of the particle. Heating both removes residual liquid and fixes the toner to paper. The fusing step can be accomplished by the application of heat and pressure to the final image. Fusing can provide increased color saturation, improved toner adhesion to the receiver, and modification of the image surface texture. A fusing device can be a cylinder or belt. The fusing device can have an elastomeric coating which provides a conformable surface to enable improved heat transfer to the receiver. The fusing device can have a smooth or textured surface. The fusing step can be combined with the transfer step. In many fusing devices such as the fuser utilized with the toner receiver layer of the present invention, a fuser-oil, such silicone oil is applied at the nip to aid the release of the toner from the fuser roller.

In forming toner images on conventional receiving sheets, the fusing and fixing of the toner to the sheet by the fusing rolls, creates gloss in the toned areas, i.e., in the so-called D max or black areas of the image. In the untoned areas, however, in the so-called D min or white areas, no gloss is formed. In accordance with the present invention, however, it is preferred that when the toner-bearing receiver sheet is subjected to heat and pressure in the fusing roll nip, the entire surface of the sheet develops a substantially uniform gloss. The resulting electrophotographic image has the look and feel of a silver halide photographic print.

In a preferred embodiment, a belt fusing apparatus as described in U.S. Pat. No. 5,895,153 can be used to provide high gloss finish to the electrophotographically printed image receiving element of this invention. The belt fuser can be separate from or integral with the reproduction apparatus. In a preferred embodiment of the present invention, the belt fuser is a secondary step. The toned image is at first fixed by passing the electrophotographically printed sheet through the nip of fusing rolls within the reproduction apparatus and then subjected to belt fusing to obtain a high uniform glossy finish. The belt fusing apparatus includes an input transport for delivering marking particle image-bearing receiver members to a fusing assembly. The fusing assembly comprises a fusing belt entrained about a heated fusing roller and a steering roller, for movement in a predetermined direction about a closed loop path. The fusing belt is, for example, a thin metallic or heat resistant plastic belt. Metal belts can be electroformed nickel, stainless steel, aluminum, copper or other such metals, with the belt thickness being about 2 to 5 mils. Seamless plastic belts can be formed of materials such as polyimide, polypropylene, or the like, with the belt thickness summarily being about 2 to 5 mils. Usually these fusing belts are coated with thin hard coatings of releasing material such as silicone resins, fluoropolymers, or the like. The coatings are typically thin (1 to 10 microns), very smooth, and shiny. Such fusing belts could also be made with some textured surface to produce images of lower gloss or texture.

The belt fuser can have a pressure roller located in nip relation with the heated fusing roller. A flow of air is directed at an area of the belt run upstream of the steering roller and adjacent to the steering roller to cool such area. The cooling action provides for a commensurate cooling of a receiver member, bearing a marking particle image, while such member is in contact with the fusing belt. The cooling action for the receiver member serves as the mechanism to substantially prevent offset of the marking particle image to the pressure roller.

The belt fusing apparatus can be mounted in operative association with a belt tracking control mechanism.

High gloss finish can also be provided to the electrophotographically printed image receiving element of this invention by using calendering methods known in the art. Calendering is defined herein as a process in which pressure is applied to the imaged substrate, that has been preferably roller fused in the printing apparatus, by passing it between highly polished, metal rollers that are optionally heated, imparting a glossy, smooth surface finish to the substrate. The degree of pressure and heat controls the extent of gloss. Calendering differs from roller fusing in that the latter does not necessarily use highly polished rollers, is always carried out at high temperatures and the nip pressures are lower than those experienced at the calendering nip.

The toner utilized with the toner receiver element of the invention contains, for example, a polymer (a binder resin), a colorant and an optional releasing agent.

As the polymer, known binder resins are useable. Concretely, these binder resins include homopolymers and copolymers such as polyesters, styrenes, e.g. styrene and chlorostyrene; monoolefins, e.g. ethylene, propylene, butylene and isoprene; vinyl esters, e.g. vinyl acetate, vinyl propionate, vinyl benzoate and vinyl butyrate; α-methylene aliphatic monocarboxylic acid esters, e.g. methyl acrylate, ethyl acrylate, butyl acrylate, dodecyl acrylate, octyl acrylate, phenyl acrylate, methyl methacrylate, ethyl methacrylate, butyl methacrylate and dodecyl methacrylate; vinyl ethers, e.g. vinyl methyl ether, vinyl ethyl ether and vinyl butyl ether; and vinyl ketones, e.g. vinyl methyl ketone, vinyl hexyl ketone and vinyl isopropenyl ketone. Particularly desirable binder resins include polystyrene resin, polyester resin, styrene/alkyl acrylate copolymers, styrene/alkyl methacrylate copolymers, styrene/acrylonitrile copolymer, styrene/butadiene copolymer, styrene/maleic anhydride copolymer, polyethylene resin and polypropylene resin. They further include polyurethane resin, epoxy resin, silicone resin, polyamide resin, modified rosin, paraffins and waxes. In these resins, styrene/acryl resins are particularly preferable.

As the colorants, known colorants can be used. The colorants include, for example, carbon black, Aniline Blue, Calcoil Blue, Chrome Yellow, Ultramarine Blue, Du Pont Oil Red, Quinoline Yellow, Methylene Blue Chloride, Phthalocyanine Blue, Malachite Green Oxalate, Lamp Black, Rose Bengal, C.I. Pigment Red 48:1, C.I. Pigment Red 122, C.I. Pigment Red 57:1, C.I. Pigment Yellow 97, C.I. Pigment Yellow 12, C.I. Pigment Yellow 17, C.I. Pigment Blue 15:1 and C.I. Pigment Blue 15:3. The colorant content is, for example, 2 to 8% by weight. When the colorant content is 2% or more by weight, a sufficient coloring power can be obtained, and when it is 8% or less by weight, good transparency can be obtained.

The toner utilized with the toner receiver element of the present invention optionally contains a releasing agent. The releasing agents preferably used herein are waxes. Concretely, the releasing agents usable herein are low-molecular weight polyolefins such as polyethylene, polypropylene and polybutene; silicone resins which can be softened by heating; fatty acid amides such as oleamide, erucamide, ricinoleamide and stearamide; vegetable waxes such as carnauba wax, rice wax, candelilla wax, Japan wax and jojoba oil; animal waxes such as bees wax; mineral and petroleum waxes such as montan wax, ozocerite, ceresine, paraffin wax, microcrystalline wax and Fischer-Tropsch wax; and modified products thereof. When a wax containing a wax ester having a high polarity, such as carnauba wax or candelilla wax, is used as the releasing agent, the amount of the wax exposed to the toner particle surface is inclined to be large. On the contrary, when a wax having a low polarity such as polyethylene wax or paraffin wax is used, the amount of the wax exposed to the toner particle surface is inclined to be small.

Irrespective of the amount of the wax inclined to be exposed to the toner particle surface, waxes having a melting point in the range of 30 to 150° C. are preferred and those having a melting point in the range of 40 to 140° C. are more preferred.

The wax is, for example, 0.1 to 10% by mass, and preferably 0.5 to 7% by mass, based on the toner.

The toner used with the toner receiver element of the present invention may contain an additive. Fine powders of inorganic compounds and fine particles of organic compounds are used as the additive. Fine particles of the inorganic compounds are those of, for example, $SiO_2$, $TiO_2$, $Al_2O_3$, CuO, ZnO, $SnO_2$, $Fe_2O_3$, MgO, BaO, CaO, $K_2O$, $Na_2O$, $ZrO_2$, $CaO.SiO_2$, $K_2O.(TiO_2)_n$, $Al_2O_3.2SiO_2$, $CaCO_3$, $MgCO_3$, $BaSO_4$ and $MgSO_4$. The fine particles of organic compounds are those of fatty acids and derivatives thereof and metal salts thereof, and also those of resins such as fluoro resins, polyethylene resins and acrylic resins.

The average particle diameter of the toner used in the present invention is, for example, 3 to 15 micrometers, preferably 4 to 10 micrometers. The storage elastic modulus G' of the toner per se (determined at an angular frequency of 10 rad/sec) at 150° C. is preferably in the range of 10 to 200 Pa for good fusing.

The toner receiver element of the present invention preferably comprises a toner receiver layer containing a polymer coated on both surfaces of the above mentioned support coated with a polyolefin resin. The toner receiver layer as mentioned earlier has the function of receiving an image-forming toner from a developing drum or an intermediate transfer medium by (static) electricity, pressure, etc. in the transferring step and fixing the image by heat, and/or pressure in the fixing step. Further, it also enables the entire surface of the element to develop a substantially uniform gloss after the invention fusing step, particularly after the belt fusing step. The resulting electrophotographic image has the look and feel of a silver halide photographic print. This is not possible on a commercially available standard paper since during the fusing step the thermoplastic is present only in the image areas leading to high differential gloss and difficulty in belt fusing due to differential adhesion forces of various areas of the print to the heated belt.

The toner receiver layer utilized in the present invention suitably has a dry coverage of 5 to 50 $g/m^2$, or 8 to 35 $g/m^2$ in a preferred embodiment for achieving minimum differential gloss and image relief. The coverage of the toner receiver layer is such that it maintains the surface texture of the underlying polyolefin resin layer.

The toner receiver layer of the invention comprises a thermoplastic polymer or thermoplastic blend of polymers that have a glass transition temperature or Tg that is close to that of the thermoplastic toner that is transferred to the toner receiver layer. Preferably, the Tg of the toner receiver layer is within 10° C. of the Tg of the toner. Consequently, the toner and the toner receiver layer both melt when the toner is fixed to the receiving layer by heat and pressure. This contributes to the adhesion of the toner to the layer and to achieving of high gloss in both the toned (Dmax) and untoned (Dmin) areas of the image resulting in unnoticeable differential gloss. High gloss and low differential gloss give the resultant prints a photo quality look and feel.

Materials useable for the invention toner receiver layer include a thermoplastic polymer which is capable of being deformed at the fixing temperature and also capable of receiving the toner and providing uniform gloss after fusing. It is preferred that the Tg of the toner receiver layer be between 40 and 100° C. preferably between 40 and 85° C.

The thermoplastic polymers suitable for the toner receiver layer include, for example, polyester resins, polyurethane resins, polyamide resin, polyurea resin, polysulfone resin, polyvinyl chloride resin, polyvinylidene chloride resin, vinyl chloride/vinyl acetate copolymer resin, vinyl chloride/vinyl propionate copolymer resin, polyol resins such as polyvinyl butyral; and cellulose resins such as ethyl cellulose resin and cellulose acetate resin, polycaprolactone resin, styrene/maleic anhydride resin, polyacrylonitrile resin, polyether resins, epoxy resins and phenolic resins, polyolefin resins such as polyethylene resin and polypropylene resin; copolymer resins composed of an olefin such as ethylene or propylene and another vinyl monomer; and acrylic resins, polystyrene resins, styreneibutylacrylate copolymes, and mixtures thereof. The thermoplastic resins are preferably polyesters, acrylics, styrenics, styrene/acryl acid ester copolymers, styrene/methacrylic acid ester copolymers, and mixtures thereof. In many cases, since the above-mentioned resins and copolymers are used for forming the toner, the thermoplastic polymer included in the toner image receiver layer preferably belongs to the same group as that of these resins and copolymers. In a preferred embodiment the thermoplastic resins most preferred for the toner receiver layer are polyesters. The preferred thermoplastic resins may be water or organic solvent soluble or dispersible to enable coating on to the polyethylene resin layer.

Polyester resins in the toner receiver layer include polyester ionomers and are obtained by the condensation of a dicarboxylic acid component such as terephthalic acid, isophthalic acid, maleic acid, fumaric acid, phthalic acid, adipic acid, sebacic acid, azelaic acid, abietic acid, succinic acid, trimellitic acid or pyromellitic acid (such a dicarboxylic acid component may have a sulfonic acid group, carboxyl group or the like substituted thereof) with an alcohol component such as ethylene glycol, diethylene glycol, propylene glycol, bisphenol A, diether derivative of bisphenol A (such as 2 ethylene oxide adduct of bisphenol A or 2 propylene oxide adduct of bisphenol A), bisphenol S, 2-ethylcyclohexyldimethanol, neopentyl glycol, cyclohexyldimethanol or glycerol (such an alcohol component may have a hydroxyl group or the like substituted thereof); polyacrylic acid ester resins or polymethacrylic acid ester resins such as polymethyl methacrylate, polybutyl methacrylate, polymethyl acrylate and polybutyl acrylate; polycarbonate resins; polyvinyl acetate resins; styrene acrylate resins; styrene/methacrylic acid ester copolymer resins and vinyltoluene acrylate resins.

Polyester ionomers are polyesters having ionic (or ionizable) functionalities. The term “polyester ionomer” of the toner receiver, as used herein, includes branched and unbranched, homo and copolymers, crosslinked or uncrosslinked polymers. The polyester ionomer is an essentially hydrophobic, substantially amorphous, thermoplastic polymer in which ionic groups or moieties are present in sufficient number to provide water dispersibility prior to coating. The polyester dispersions provide advantageous properties such as good film-formation, excellent fingerprint resistance, toughness, elasticity and durability. Furthermore, the polyesters exhibit tensile and flexural strength and resistance to various oils.

Procedures for the preparation of polyester ionomers for the toner receiver layer are described in U.S. Pat. Nos. 3,018,272; 3,563,942; 3,734,874; 3,779,993; 3,929,489; 4,307,174, 4,395,475, 5,939,355 and 3,929,489, the disclosures of which are incorporated herein by reference. The polyester ionomers useful in this invention comprise dicarboxylic acid recurring units typically derived from dicarboxylic acids or their functional equivalents and diol recurring units typically derived from diols. Generally, such polyesters are prepared by reacting one or more diols with one or more dicarboxylic acids or their functional equivalents (e.g. anhydrides, diesters or diacid halides), as described in detail in the cited patents. Such diols, dicarboxylic acids and their functional equivalents are sometimes referred to in the art as polymer precursors. It should be noted that, as known in the art, carbonylimino groups can be used as linking groups rather than carbonyloxy groups. This modification is readily achieved by reacting one or more diamines or amino alcohols with one or more dicarboxylic acids or their functional equivalents. Mixtures of diols and diamines can be used if desired.

Conditions for preparing the polyesters useful in the toner receiver layer this invention are known in the art as described above. The polymer precursors are typically condensed in a ratio of at least 1 mole of diol for each mole of dicarboxylic acid in the presence of a suitable catalyst at a temperature of from about 125° to about 300° C. Condensation pressure is typically from about 0.1 mm Hg to about one or more atmospheres. Low-molecular weight by-products can be removed during condensation, e.g. by distillation or another suitable technique. The resulting condensation polymer is polycondensed under appropriate conditions to form a polyester. Polycondensation is usually carried out at a temperature of from about 150° to about 300° C. and a pressure very near vacuum, although higher pressures can be used.

The polyesters for the toner receiver layer described herein (referred to as “ionomers” or “polyester ionomers”) contain at least one ionic moiety, which can also be referred to as an ionic group, functionality, or radical. In a preferred embodiment of this invention, the recurring units containing ionic groups are present in the polyester ionomer in an amount of from about 1 to about 12 mole percent, based on the total moles of recurring units. Such ionic moieties can be provided by either ionic diol recurring units and/or ionic dicarboxylic acid recurring units, but preferably by the latter. Such ionic moieties can be anionic or cationic in nature, but preferably, they are anionic. Exemplary anionic ionic groups include carboxylic acid, sulfonic acid, and disulfonylimino and their salts and others known to a worker of ordinary skill in the art. Sulfonic acid ionic groups, or salts thereof, are preferred.

One type of ionic acid component has the structure

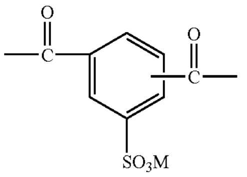

where M=H, Na, K or $NH_4$.

Ionic dicarboxylic acid recurring units can be derived from 5-sodiosulfobenzene-1,3-dicarboxylic acid, 5-sodiosulfocyclohexane-1,3-dicarboxylic acid, 5-(4-sodiosulfophenoxy) benzene-1,3-dicarboxylic acid, 5-(4-sodiosulfophenoxy)cyclohexane-1,3-dicarboxylic acid, similar compounds and functional equivalents thereof and others described in U.K. Patent Specification No. 1,470,059 (published Apr. 14, 1977). Other suitable polyester ionomers for protective overcoats in the imaged elements of the present invention are disclosed in U.S. Pat. Nos. 4,903,039 and 4,903,040, which are incorporated herein by reference.

Another type of ionic dicarboxylic acid found useful in the practice of this invention is represented by the formula:

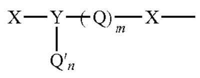

wherein each of m and n is 0 or 1 and the sum of m and n is 1; each X is carbonyl; Q has the formula:

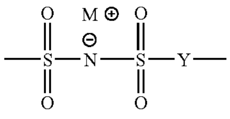

Q' has the formula:

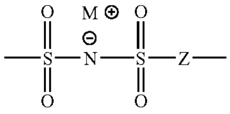

Y is a divalent aromatic radical, such as arylene (e.g. phenylene, naphthalene, xylylene, etc.) or arylidyne (e.g. phenenyl, naphthylidyne, etc.); Z is a monovalent aromatic radical, such as aryl, aralkyl or alkaryl (e.g. phenyl, p-methylphenyl, naphthyl, etc.), or alkyl having from 1 to 12 carbon atoms, such as methyl, ethyl, isopropyl, n-pentyl, neopentyl, 2-chlorohexyl, etc., and preferably from 1 to 6 carbon atoms; and M is a solubilizing cation and preferably a monovalent cation such as an alkali metal or ammonium cation.

Exemplary dicarboxylic acids and functional equivalents of this type from which such ionic recurring units are derived are 3,3'-[(sodioimino)disulfonyl]dibenzoic acid;

3,3'-[(potassioimino)disulfonyl]dibenzoic acid, 3,3'-[(lithioimino)disulfonyl]dibenzoic acid;

4,4'-[(lithioimino)disulfonyl]dibenzoic acid;

4,4'-[(sodioimino)disulfonyl]dibenzoic acid;

4,4'-[(potassioimino)disulfonyl]dibenzoic acid; 3,4'-[(lithioimino)disulfonyl]dibenzoic acid;

3,4'-[(sodioimino)disulfonyl]dibenzoic acid;

5-[4-chloronaphth-1-ylsulfonyl(sodioimino)sulfonyl] isophthalic acid; 4,4'-[(potassioimino)disulfonyl]dinaphthoic acid;

5-[p-tolylsulfonyl(potassioimino)sulfonyl]isophthalic acid; 4-[p-tolylsulfonyl(sodioimino)sulfonyl]-1,5-naphthalenedicarboxylic acid;

5-[n-hexylsulfonyl(lithioimino)sulfonyl]isophthalic acid; 2-[phenylsulfonyl(potassioimino)sulfonyl]terephthalic acid and functional equivalents thereof. These and other dicarboxylic acids useful in forming preferred ionic recurring units are described in U.S. Pat. No. 3,546,180 (issued Dec. 8, 1970 to Caldwell et al) the disclosure of which is incorporated herein by reference.

A preferred monomeric unit of this type has the following structure:

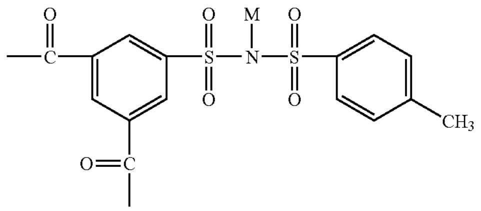

wherein M is as defined above.

It is also possible to have combinations of different ionic groups in the same recurring unit of a polyester ionomer, for example, as shown in U.S. Pat. No. 5,534,478 (the last structure in column 3).

A preferred class of polyester ionomers employed in the toner receiver layer of the present invention comprises the polymeric reaction product of: a first dicarboxylic acid; a second dicarboxylic acid comprising an aromatic nucleus to which is attached sulphonic acid group; an aliphatic diol compound, and an aliphatic cycloaliphatic diol compound. The second dicarboxylic acid comprises from about 2 to 25 mol percent of the total moles of first and second dicarboxylic acids. The second diol comprises from about 0 to 50 mol percent of the total moles of the first and second diol.

The first dicarboxylic acid or its anhydride, diester, or diacid halide functional equivalent may be represented by the formula: —CO—$R_1$—CO— where $R_1$ is a saturated or unsaturated divalent hydrocarbon, an aromatic or aliphatic group or contains both aromatic and aliphatic groups. Examples of such acids include isophthalic acid, 5-t-butylisophthalic acid, 1,1,3-trimethyl-3-4-(4-carboxylphenyl)-5-indancarboxylic acid, terephthalic acid, 2,6-naphthalenedicarboxylic acid, or mixtures thereof. The first acid may also be an aliphatic diacid where $R_1$ is a cyclohexyl unit or 2-12 repeat units of a methylene group, such as succinic acid, adipic acid, glutaric acid and others. Dicarboxylic acids which have moieties which are sensitive to actinic radiation are also useful. Exemplary radiation sensitive dicarboxylic acids or functional equivalents thereof are described in U.S. Pat. No. 3,929,489 (issued Dec. 30, 1975 to Arcesi et al) the disclosure of which is incorporated herein by reference. The first dicarboxylic acid is preferably an aromatic acid or a functional equivalent thereof, most preferably, isophthalic acid.

The second dicarboxylic acid may be a water-dispersible aromatic acid containing an ionic moiety that is a sulfonic acid group or its metal or ammonium salt as described earlier.

Examples include the sodium, lithium, potassium or ammonium salts of sulfoterephthalic acid, sulfonaphthalenedicarboxylic acid, sulfophthalic acid, sulfoisophthalic acid, and 5-(4-sulfophenoxy) isophthalic acid, or their functionally equivalent anhydrides, diesters, or diacid halides. Most preferably, the second dicarboxylic acid comprises a soluble salt of 5-sulfoisophthalic acid or dimethyl 5-sulfoisophthalate. The ionic dicarboxylic acid repeating units of the polyester ionomers employed as protective overcoat layers in accordance with the invention comprise from about 1 to about 25 mol percent, preferably about 10 to 25 mole percent of the total moles of dicarboxylic acids.

The dicarboxylic acid recurring units are linked in a polyester by recurring units derived from difunctional compounds capable of condensing with a dicarboxylic acid or a functional equivalent thereof. Suitable diols are represented by the formula: HO—$R_2$—OH, where $R_2$ is aliphatic, cycloaliphatic, or aralkyl. Examples of useful diol compounds include the following: ethylene glycol, diethylene glycol, propylene glycol, 1,2-cyclohexanedimethanol, 1,2-propanediol, 4,4'-isopropylidene-bisphenoxydiethanol, 4,4'-indanylidene-bisphenoxydiethanol, 4,4'-fluorenylidene-bisphenoxydiethanol, 1,4-cyclohexanedimethanol, 2,2'-dimethyl-1,3-propanediol, p-xylylenediol, and glycols having the general structure $H(OCH_2CH_2)_n$—H or $H(CH_2)_n$OH, where n=2 to 10. Diethyleneglycol, 1,4-cyclohexanedimethanol, pentanediol, and mixtures thereof are especially preferred.

The polyester ionomers suitable for the toner receiver layer of this invention have a glass transition temperature (Tg) of about 100° C. or less and, preferably, from about 40° C. to 85° C. Tg values can be determined by techniques such as differential scanning calorimetry or differential thermal analysis, as disclosed in N. F. Mott and E. A. Davis, *Electronic Processes in Non-Crystalline Material*, Oxford University Press, Belfast, 1971, at p. 192. Preferred polyester ionomers for use in the present invention include the EASTMAN AQ™ polymers manufactured by Eastman Chemical Company of Kingsport, Tenn.

The polyester ionomers utilized in the toner receiver layer of this invention have a molecular weight (Mn) preferably above 10,000, more preferably above about 14,000 that disperse directly in water without the assistance of organic cosolvents, surfactants, or amines. As indicated above, this water dispersibility is attributable in large part to the presence of ionic substituents, for example, sulfonic acid moieties or salts thereof, for example, sodiosulfo moieties ($SO_3Na$) in the polymer. Properties and uses of these polymers are described in Publication No. GN-389B of Eastman Chemical Company, dated May 1990, the disclosure of which is incorporated herein by reference. Especially preferred is poly[1,4-cyclohexylenedimethylene-co-2,2'-oxydiethylene (46/54) isophthalate-co-5-sodiosulfo-1,3-benzenedicarboxylate (82/18)] (obtained as EASTMAN AQ™ 55 polymer, Tg 55° C. from Eastman Chemical Co.).

The commercially available salt forms of the polyester ionomer, including the aforementioned AQ® polymers, have been shown to be effective in the present invention.

Mixtures of polyester ionomers can be used if desired. Also, the polyester ionomer may comprise a blend with at least one other water-dispersible polymer. The other polymer may comprise a variety of materials, including condensation and/or addition polymer such as vinyl polymers, polyurethanes, urethane-vinyl hybrids such as IPNs, polyethylenes, and the like or mixtures thereof. Examples of such water-dispersible polymers also include, for example, polyvinyl chloride and the like in U.S. Pat. No. 5,853,926 to Bohan et al.

Other optional non-soluble vinyl polymers for use in toner receiver compositions according to the present invention include, for example, those obtained by copolymerizing one or more ethylenically unsaturated monomers including, for example, alkyl esters of acrylic or methacrylic acid such as methyl methacrylate, ethyl methacrylate, butyl methacrylate, ethyl acrylate, butyl acrylate, hexyl acrylate, n-octyl acrylate, lauryl methacrylate, 2-ethylhexyl methacrylate, nonyl acrylate, benzyl methacrylate, the hydroxyalkyl esters of the same acids such as 2-hydroxyethyl acrylate, 2-hydroxyethyl methacrylate, and 2-hydroxypropyl methacrylate, the nitrile and amides of the same acids such as acrylonitrile, methacrylonitrile, and methacrylamide, vinyl acetate, vinyl propionate, vinylidene chloride, vinyl chloride, and vinyl aromatic compounds such as styrene, t-butyl styrene and vinyl toluene, dialkyl maleates, dialkyl itaconates, dialkyl methylene-malonates, isoprene, and butadiene. Suitable ethylenically unsaturated monomers containing carboxylic acid groups include acrylic monomers such as acrylic acid, methacrylic acid, ethacrylic acid, itaconic acid, maleic acid, fumaric acid, monoalkyl itaconate including monomethyl itaconate, monoethyl itaconate, and monobutyl itaconate, monoalkyl maleate including monomethyl maleate, monoethyl maleate, and monobutyl maleate, citraconic acid, and styrene carboxylic acid. Suitable polyethylenically unsaturated monomers include butadiene, isoprene, allylmethacrylate, diacrylates of alkyl diols such as butanediol diacrylate and hexanediol diacrylate, divinyl benzene and the like.

An average molecular weight of the thermoplastic polymer used for forming the toner receiver layer is preferably larger than that of the thermoplastic polymer used for forming the toner. However, the average molecular weight may change depending on the relationship between the thermodynamic properties of the toner polymer and that of the image receiving layer polymer. For example, when the softening temperature of the image receiver layer polymer is higher than that of the toner polymer, it is preferred that the average molecular weight of the thermoplastic polymer used for forming the toner receiver layer be equal to or lower than that of the thermoplastic polymer used for forming the toner. It is also preferred to use a mixture of various thermoplastic polymers having the same compositions but different average molecular weights as the thermoplastic polymer for forming the toner receiver layer. It is preferred that the molecular weight distribution of the thermoplastic polymer used for forming the toner receiver layer be broader than that of the thermoplastic polymer for forming the toner.

The polymer for forming the toner receiver layer used in the present invention may be a water-soluble polymer or a water-dispersed polymer such as the polyesterionomer described above. The water-soluble polymer is not particularly limited as regards a desirable composition, bonding structure, molecular structure, molecular weight, molecular weight distribution and form so long as it is a polymer which is soluble in water. In this connection, the molecular structure of the water soluble polymer is preferably a water-soluble group such as a sulfonic acid group, a hydroxyl group, a carboxylic acid group, an amino group, an amido group and an ether group. The water-soluble polymers may also include, for example, vinylpyrrolidone/vinyl acetate copolymer, styrene/vinylpyrrolidone copolymer, styrene/maleic anhydride copolymer, water-dispersible polyesters, water-dispersible polyurethanes, water-soluble nylon and water-soluble epoxy resin.

The water-dispersed polymer is suitably selected from among a water- dispersed type resin such as water-dispersed polyesterionomer resins described above, acrylic resin, water-dispersed polystyrene resin and water-dispersed urethane resin; an emulsion such as acrylic resin emulsion, polyvinyl acetate emulsion, SBR (styrene/butadiene/rubber) emulsion; and a copolymer, mixture or cation denaturant thereof. A combination of two or more of these resins is also usable.

The organic solvent soluble resin for the toner receiver layer may be selected from styrene acrylic copolymer resins, styrene butadiene copolymer resins, acrylic resins, polyester resins and the like. Preferable organic solvents include toluene, methyl ethyl ketone and ethyl acetate, but are not limited to these.

The toner receiver layer of the present invention preferably contains a fuser-oil sorbent additive. Fuser-oil sorbent additives include adsorbents and absorbents and may be any suitable material. They have specific physical and chemical properties that allow them to capture the excess fuser-oil. Sorbent additives may be organic or inorganic and may be synthetic. Typical of such materials are clay, talc, glass wool, silica, peat moss, synthetic fibers such as nylon, plastic adsorbent microspheres and the like. The preferred material are clay and talc since they are readily available in a manner that can be easily formulated into coating dispersions for the toner receiver layer, can be obtained at a high brightness index and is inexpensive. Of these kaolin clay is optimum and is used in an amount greater than 10 weight percent of the toner receiver layer and preferably from 10 to 60 weight percent of the layer. The amount of sorbent additive such as clay in the layer can also be used to control the level of gloss in the imaged element, especially after belt fusing. The clay additive is also used to enable writablity after printing. This is especially useful in applications such as greeting cards and calendars where writability is important. The fuser-oil sorbent materials such as the clays usable herein preferably have a GE brightness index greater than 88% and include various modified and unmodified clays including nanoclays. Brightness is the percent of blue light reflected off a sample measured at an effective wavelength of 457 nm. GE brightness is a directional brightness measurement utilizing essentially parallel beams of light to illuminate the paper surface at an angle of 45 degrees.

The clay materials suitable for the sorbent additive of this invention include phyllosilicates, e.g., montmorillonite, particularly sodium montmorillonite, magnesium montmorillonite, and/or calcium montmorillonite, nontronite, beidellite, volkonskoite, hectorite, saponite, sauconite, sobockite, stevensite, svinfordite, vermiculite, magadiite, kenyaite, talc, mica, kaolinite (kaolin or china clay), and mixtures thereof. Preferred clays are swellable so that other agents, usually organic ions or molecules, can intercalate or exfoliate the layered material resulting in a desirable dispersion of the inorganic phase. The aforementioned clay can be natural or synthetic, for example, synthetic smectite clay. For this invention, the clay particles in the dispersed form preferably have a particle size where greater then 90% of the particles are less than or equal to 2 micrometers. A preferred average size is between 0.1 and 2 micrometers for good oil sorption and uniform coating.

The clay used in this invention can be an organoclay. Organoclays are produced by interacting the unfunctionalized clay with suitable intercalants. These intercalants are typically organic compounds, which are neutral or ionic. Useful neutral organic molecules include polar molecules such as amides, esters, lactams, nitriles, ureas, carbonates, phosphates, phosphonates, sulfates, sulfonates, nitro compounds, and the like. The neutral organic intercalants can be monomeric, oligomeric or polymeric. Neutral organic molecules can cause intercalation in the layers of the clay through hydrogen bonding, without completely replacing the original charge balancing ions. Useful ionic compounds are cationic surfactants including onium species such as ammonium (primary, secondary, tertiary, and quaternary), phosphonium, or sulfonium derivatives of aliphatic, aromatic or arylaliphatic amines, phosphines and sulfides. Typically onium ions can cause intercalation in the layers through ion exchange with the metal cations of the preferred smectite clay. A number of commercial organoclays for example Cloisite 15A, a natural montmorillonite modified with a quaternary ammonium salt, are available from clay vendors, such as Southern Clay Products and Nanocor, which may be used in the practice of this invention.

The electrophotographic toner receiver element utilized in the present invention preferably has a high degree of whiteness and brightness, when used for photo rich applications. Whiteness refers to the extent that paper diffusely reflects light of all wavelengths throughout the visible spectrum. Whiteness is an appearance term. As for the degree of whiteness, L* value, a measure of the lightness (100 for perfect white to 0 for black), in CIE 1976 (L*a*b*) color space is at least 80, preferably at least 85 and more preferably at least 90. The coloration of the white color is desirably as neutral as possible. As for the coloration of the white color, the value of $(a^*)^2+(b^*)^2$ in L*a*b* space is preferably not higher than 50, more preferably not higher than 18 and most preferably not higher than 5. The chromaticity dimensions (a and b) give designations of color such that "a" measures redness when positive, gray when zero and greenness when negative, and "b" measures yellowness when positive, gray when zero and blueness when negative. The L*a*b* space is designed to have a uniform correspondence between geometric distances and perceptual distances between colors that are seen under the same reference illumination. The perceived difference between any two colors is proportional to the geometric distance in color space between their colors. Brightness is defined as the percentage reflectance of blue light only at a wavelength of 457 nm. Brightness is an arbitrarily defined, but carefully standardised, blue reflectance that is used throughout the pulp and paper industry for the control of mill processes and in certain types of research and development programs. Brightness is not whiteness. However, the brightness values of the pulps and pigments going into the paper provide an excellent measure of the maximum whiteness that can be achieved with proper tinting. The degree of whiteness for the electrophotographic image receiver sheet of the present invention is preferable greater than 90 in order to attain the look of photographic paper.

The materials useable for the toner receiver layer of the present invention may contain various additives in order to improve the stability of the output image and also the stability of the toner receiver layer itself. The additives for these purposes include various known antioxidants, agents for preventing aging, agents for preventing deterioration, agents for preventing deterioration caused by ozone, ultraviolet absorbers, light stabilizers, antiseptics and antifungal agents. The toner receiver layer of this invention may also contain other additives such as colorants, tinting agents, brightening agents, plasticizers, slip agents and the like.

The inorganic particles of the marking enhancement layer coated over the toner receiver layer may be chosen from inorganic particles such as silica, alumina, and titania. Of these silica is most preferred since it is cheap and simple to formulate in an aqueous coating formulation in a wide pH range. The silica used in this invention is preferred to be a surface-hydroxylated aluminum modified colloidal dispersion of silica in an aqueous medium with a partial substitution of aluminum for silicon, preferably with an average particle size, less than 200 nm, more preferably between 5-50 nm. Commercially available dispersions such as Ludox AM supplied by DuPont can be used as the source of silica for the present invention.

The binder for the marking enhancement layer of the toner receiver element can be any film-forming polymer, provided it has good adhesion to the underlying thermoplastic toner receiver layer. The binder polymer can be one or more of a water soluble polymer, a hydrophilic colloid or a water insoluble polymer, latex or dispersion. Particular preference is given to polymers selected from the group of polymers and interpolymers prepared from ethylenically unsaturated monomers such as styrene, styrene derivatives, acrylic acid or methacrylic acid and their derivatives, olefins, (meth)acrylonitriles, itaconic acid and its derivatives, maleic acid and its derivatives, vinyl halides, vinylidene halides, and others. Also included are aqueous dispersions of condensation polymers such as polyurethanes and polyesters and hydrophilic colloids such as derivatives of cellulose. The total dry weight % of silica in the marking enhancement layer of the toner receiver layer can vary from 50 to 99.5, but preferably between 70 to 98. The dry coverage of the marking enhancement layer of the present invention generally is less than 5 $g/m^2$, but preferably from 0.01-2 $g/m^2$.

In addition to the silica, preferably aluminum modified colloidal silica and a polymeric film-forming binder with good adhesion to the underlying thermoplastic layer, the coating composition of the present invention may include other ingredients (vide U.S. Pat. No. 5,405,907, for example), colorants, crosslinking agents, surfactants and coating aids, defoamers, thickeners, coalescing aids, matte beads, lubricants, pH adjusting agents and other ingredients known in the art.

The coating solution for forming the marking enhancement layer of the present invention can be aqueous or non-aqueous; however, aqueous solutions are preferred for environmental reasons.

While the invention may find its most common use for writing on the non-image bearing side of the printed receiver, it is also possible within the scope of this invention, to write on either side of the printed receiver after belt fusing.

The toner receiver layer and/or the marking enhancement layer may also contain matte particles to improve transport through the electrophotographic machine. The matte particles have an average diameter between 10 and 20 micrometers, preferably between 10 and 15 micrometers. The amount of matte particles incorporated in the toner receiver layer is dependent on the thickness of the toner receiver layer. Generally the matte has a dry coverage between 0.05 $g/m^2$ and 0.6 $g/m^2$, and preferably between 0.11 and 0.22 $g/m^2$ in order to obtain good writability and transport without compromising the surface gloss after imaging and fusing the toned image.

The matte particles may comprise inorganic materials such as silica or alumina or polymeric materials. To maintain their shape after the fusing process, the polymeric matte particle should have a glass transition temperature greater than the fusing temperature or be crosslinked. The polymeric particles are generally made from vinyl monomers and/or divinyl monomers. Preferred polymeric particles are crosslinked acrylates or styrenic polymers. Most preferred are particles comprising poly(methyl methacrylate-co-divinylbenzene), poly(methyl methacrylate-co-ethylene glycol dimethacrylate) or poly(styrene-co-divinylbenzene).

Although the image receiving element of this invention is highly suitable for electrophotographic fusing methods that utilize a fuser-oil at the fuser nip, it may also be used with fuser-oil free systems.

The coating composition for the toner receiver layer and the marking enhancement layer utilized in this invention can be applied by any of a number of well known techniques, such as dip coating, rod coating, blade coating, air knife coating, gravure coating and reverse roll coating, slot coating, extrusion coating, bead coating, curtain coating, spray coating and the like. Exemplary bead coating methods and apparatus are disclosed in U.S. Pat. No. 2,761,417 to Russell et al., U.S. Pat. No. 3,474,758 to Russell et al., U.S. Pat. No. 2,761,418 to Russell et al., U.S. Pat. No. 3,005,440 to Padday, and U.S. Pat. No. 3,920,862 to Damschroder et al. Exemplary curtain coating methods and apparatus are disclosed in U.S. Pat. No. 3,508,947 to Hughes, U.S. Pat. No. 3,632,374 to Greiller, and U.S. Pat. No. 4,830,887 to Reiter. Known coating methods are described in further detail in Research Disclosure No. 308119, Published December 1989, pages 1007 to 1008.

After applying the coated layers to the support, it may be dried by any of a plurality of methods including, but not limited to, heating belts, high temperature radiant sources and convective heating. Almost exclusively, however, the dryers in large scale coating machines primarily rely on convective heating. In convective heating, a heater is used to heat a gas, or mixture of gasses (e.g.—air), that is introduced into the dryer. This lowers the relative humidity of the gas (or gasses), which is then circulated by blowing it through the dryer sections. Several modes of circulation may be employed: co-current or counter-current to the direction of the web, or in a random fashion. Known drying methods are described in further detail in Research Disclosure No. 308119, Published December 1989, pages 1007 to 1008.

In typical large scale coating machines using convective drying, the dryer setting can vary, depending on the length of the dryer and the load (amount of material to be dried). If the dwell time in drying zones is short and/or the load is heavy, a more rapid rate of solvent evaporation may be required. This can be achieved through higher temperatures and/or a large difference between the dry bulb temperature and wet bulb temperature of the supply gas (or gasses). For the aqueous coating composition of the toner receiver layer of this invention, it has been found that the coated layer uniformity was enhanced when the difference in dry bulb and wet bulb temperatures of the supply gas (or gasses) was no greater than 38° C., preferably no greater than 21° C., and most preferably no greater than 10° C. The specific sequence of drying conditions is based on the composition and wet coverage of the coated layer to prevent or minimize cracking and other drying defects.

While electrophotographic printing is preferred with the image receiving element of this invention, it may also be utilized with other printing modabilities such as inkjet, offset, and thermal.

These and other advantages will be apparent from the detailed description below.

The following examples illustrate the practice of this invention. They are not intended to be exhaustive of all possible variations of the invention. Parts and percentages are by weight unless otherwise indicated.

EXAMPLES

Example 1-3

The polyester binder used in the TRLs of the following examples was a polyester ionomer, AQ55, purchased from Eastman Chemical Company. Kaogloss 90, clay was obtained from Theile Kaolin Company as a 70 wt. % dispersion in water. Aerosol® OT, dioctyl sodium sulfosuccinate, an anionic surfactant from Cytec Industries was used as the coating surfactant for the toner receiver layers coated from water. Colloidal silica Ludox AM, average particle diameter 12 nm, for the MEL was purchased from DuPont. The latex (L) used as the binder in one of the examples was styrene-co-butylmethacrylate-co-sodium 2-sulfoethylmethacrylate in the ratio of 30/60/10 as described in Table I (column 4) of U.S. Pat. No. 5,244,728. The hyrdoxyethyl cellulose binder Cellosize QP 4400 and Triton X 200 were obtained from Dow Chemical Company. A defoamer Surfynol DF210 was obtained from Air Products and Chemicals, Inc.

A polyethylene resin melt containing 11.4 wt % $TiO_2$, 87.7 wt % LDPE, and 0.9 wt % of a mixture of colorants, optical brighteners and antioxidants, was extrusion coated on both sides of a 160 micrometer thick photographic paper support at 288-332° C. The surface finish of the resin coated paper was controlled by the finish on the chill roll used in the extrusion process. Polyethylene resin coated paper prepared thus was used for all the examples below.

Preparation of the Electrophotographic Toner Receiver Layer (TRL)

A 32 weight percent aqueous solution of a mixture of AQ 55 and Kaogloss 90 in a the weight ratio of 77:23 was coated on a corona discharge-treated, polyethylene resin coated paper described above to yield a dry coverage of 10.76 $g/m^2$ coating of AQ55.

Preparation of the Marking Enhancement Layer (MEL)

The MEL was coated from aqueous solutions of various compositions on the TRL. They comprised of colloidal silica and a film forming polymeric binder in the dry coverages as listed in Table 1.

A Control coating that did not include the silica was also prepared. The composition of the prepared control coatings and MEL coated media of the invention are given in TABLE 1.

The MEL coated media and the control media were printed in the NexPress 2100 printer. Writability was assessed by writing on the surface of the printed sheets with a No. 2 pencil and a ballpoint pen. The printed sheets were next belt fused using a 3 mil polyimide belt at 165° C., 6 ips, 35 psi(nip pressure). The resultant prints were evaluated for humidity and thermal blocking. Humidity blocking was evaluated by first conditioning 4"×6" D min samples of the printed and belt fused sheets at 37.7 C and 80% RH for 24 hours, followed by placing the samples face to face and applying 1000 gm weight on the samples for up to one week in the same environment. The samples were then peeled apart and examined for image distortion on a scale of 0-5 where 0=no image distortion and 5=severe distortion. Thermal blocking was measured by placing the samples face to face and applying 1000 gm weight on the samples for up to 6 hours in a chamber at 71° C. and 50% RH. Gloss measurements(60) were made on the belt fused samples using a BYK Gardner Glossmeter in a Dmin(white) and Dmax(black area).

It is clear that the MELs as per current invention Examples 1-2 provided marking or writability properties compared to the control even after belt fusing, while at the same maintaining the gloss characteristics. The Examples of the invention showed little differential gloss after belt fusing and the overall gloss was comparable to the control that had no silica MEL over it showing that the MEL did not interfere with the flow of the thermoplastic toner receiver layer over the surface to gloss the surface. These MEL containing samples also exhibited resistance to thermal and high humidity blocking compared to the control.

TABLE 1

| Example # | MEL Silica dry coverage ($g/m^2$) | Polymer binder (dry coverage $g/m^2$) | Blocking white/white | Pencil Writability | Pen Writability | Pen Writability Belt fused samples | *Gloss 60° Dmin(Dmax) |
|---|---|---|---|---|---|---|---|
| Control | 0 | 0 | 5 | Yes | No | No | 73.9(78.2) |
| 1 | 0.6 | Cellosize QP 4400(0.003) | 0 | Yes | Yes | Yes | 73(79.9) |
| 2 | 0.5 | L(0.12) | 0 | Yes | Yes | Yes | 72.1(83) |

*Samples belt fused at 150° C. 1.7ips

A drop of water was placed on the belt fused examples of the invention and allowed to sit for 1 minute. After wiping of the water from the surface, the examples of this invention showed resistance to water and no distortion of the paper or image. Fingerprints were also easily removed compared to a photographic silver halide print.

The invention has been described in detail with particular reference to certain preferred embodiments thereof, but it will be understood that variations and modifications can be effected within the spirit and scope of the invention.

The invention claimed is:

1. A toner receiver element comprising in order a support, at least one polyolefin resin coating, at least one toner receiver layer, and a marking enhancement layer wherein said marking enhancement layer comprises inorganic particles and a polymer film-forming binder and wherein said marking enhancement layer has a dry coverage of less than 5 $g/m^2$ and said inorganic particles comprises between 50 and 99.5 wt % of said marking enhancement layer wherein said inorganic particles have a primary particle size between 5 and 50 nanometers.

2. The toner receiver element of claim 1 wherein said marking enhancement layer overlays a toner receiver layer that is on a support.

3. The toner receiver element of claim 1 wherein said inorganic particles comprise silica.

4. The toner receiver element of claim 1 wherein said binder comprises thermoplastic polymer.

5. The toner receiver element of claim 1 wherein said binder comprises styrene acrylic copolymer.

6. The toner receiver element of claim 1 wherein said binder is selected from the group consisting of vinyl copolymers, polyesters, polyurethanes, and mixtures thereof.

7. The toner receiver layer of claim 1 wherein said binder comprises water soluble polymers, hydrophilic colloids or water insoluble polymer latices or dispersions.

8. The toner receiver element of claim 1 wherein said marking enhancement layer has a dry coverage of between 0.01 and 2 $g/m^2$.

9. The toner receiver element of claim 1 wherein said toner receiver layer further comprises a fuser-oil sorbent additive and a thermoplastic polymer and said sorbent additive is present in an amount of greater than 10% by weight of said layer.

10. The toner receiver element of claim 9 wherein said sorbent additive is clay.

11. The toner receiver element of claim 10 wherein said clay is selected from the group consisting of nontronite, beidellite, volkonskoite, hectorite, saponite, sauconite, sobockite, stevensite, svinfordite, vermiculite, magadiite, kenyaite, talc, mica, kaolinite, organic clays and mixtures thereof.

12. The toner receiver element of claim 9 wherein said sorbent additive is present in an amount of between 10 and 60 weight percent of said toner receiver layer.

13. The toner receiver element of claim 9 wherein said thermoplastic polymer comprises polyester.

14. The toner receiver element of claim 9 wherein said thermoplastic polymer comprises a polyester ionomer.

15. The toner receiver element of claim 9 wherein said thermoplastic polymer comprises an acrylic polymer.

16. The toner receiver layer of claim 9 wherein said thermoplastic polymer comprises a urethane polymer.

17. The toner receiver element of claim 9 wherein said thermoplastic polymer has a glass transition temperature of between 30° C. and 100° C.

18. The toner receiver element of claim 9 wherein said sorbent additive has an average particle size of between 0.1 and 2 micrometers.

19. The toner receiver element of claim 9 wherein said toner receiver layer further comprises matte particles.

20. An imaged element comprising a toner receiver element comprising in order a support, at least one polyolefin resin coating, at least one toner receiver layer, and a marking enhancement layer, wherein said toner receiver layer comprises a fuser-oil sorbent additive and a thermoplastic polymer and said sorbent additive is present in an amount of greater than 10% by weight of said layer, wherein said at least one toner receiver layer has an image thereon formed from toner comprising pigment and bisphenol A polyester, wherein said marking enhancement layer comprises inorganic particles and a polymer binder, wherein said marking enhancement layer has a dry coverage of less than 5 $g/m^2$ and said inorganic particles comprises between 50 and 99.5 wt % of said marking enhancement layer, and wherein said inorganic particles have a primary particle size between 5 and 50 nanometers.

21. The imaged element of claim 20 wherein said element has a 60° gloss greater than 60 in non-imaged areas after belt fusing or calendering of said element.

22. The imaged element of claim 20 wherein said element has pencil writability.

23. The imaged element of claim 20 wherein said element has ballpoint pen writability.

24. The toner receiver element of claim 1 wherein said toner receiver layer further comprises a fuser-oil sorbent additive and a thermoplastic polymer, wherein said sorbent additive is present in an amount of between 10 and 60 weight percent of said toner receiver layer and said thermoplastic polymer has a glass transition temperature of between 30° C. and 100° C.

25. The imaged element of claim 20 wherein said sorbent additive is present in an amount of between 10 and 60 weight percent of said toner receiver layer and said thermoplastic polymer has a glass transition temperature of between 30° C. and 100° C.

* * * * *

UNITED STATES PATENT AND TRADEMARK OFFICE

CERTIFICATE OF CORRECTION

PATENT NO. : 7,754,315 B2
APPLICATION NO. : 11/000259
DATED : July 13, 2010
INVENTOR(S) : Nair et al.

It is certified that error appears in the above-identified patent and that said Letters Patent is hereby corrected as shown below:

Cover Page, Item [56] References Cited, Column 2, line 8, delete “2002/0003176 A1 1/2002 Muller-Girard, Jr. et al.” and insert -- 2002/0037176 Al 3/2002 Ogino et al. --.

Column 20, line 57, Claim 1, delete “comprises” and insert -- comprise --.

Column 21, line 20, Claim 11, before “nontronite,” insert -- montmorillonite, --.

Signed and Sealed this
Twenty-eighth Day of December, 2010

David J. Kappos
*Director of the United States Patent and Trademark Office*